United States Patent
Overfield et al.

(10) Patent No.: US 8,821,151 B2
(45) Date of Patent: Sep. 2, 2014

(54) SIDE GATE NOZZLE ASSEMBLY

(75) Inventors: Sarah Kathleen Overfield, Colchester, VT (US); George Leigh Stuart, Fairfax, VT (US)

(73) Assignee: Husky Injection Molding Systems Ltd. (CA)

(*) Notice: Subject to any disclaimer, the term of this patent is extended or adjusted under 35 U.S.C. 154(b) by 0 days.

(21) Appl. No.: 13/576,206

(22) PCT Filed: Jan. 23, 2011

(86) PCT No.: PCT/US2011/022178
§ 371 (c)(1),
(2), (4) Date: Jul. 31, 2012

(87) PCT Pub. No.: WO2012/115614
PCT Pub. Date: Aug. 30, 2012

(65) Prior Publication Data
US 2013/0056562 A1    Mar. 7, 2013

Related U.S. Application Data

(60) Provisional application No. 61/300,252, filed on Feb. 1, 2010, provisional application No. 61/307,930, filed on Feb. 25, 2010.

(51) Int. Cl.
*B29C 45/22* (2006.01)
*B29C 45/27* (2006.01)

(52) U.S. Cl.
CPC ..... *B29C 45/2735* (2013.01); *B29C 2045/2798* (2013.01)
USPC ......... 425/568; 264/328.8; 425/570; 425/572

(58) Field of Classification Search
CPC ...... B29C 45/27; B29C 45/2735; B29C 45/20
USPC .................... 425/568, 570, 572; 264/328.8
See application file for complete search history.

(56) References Cited

U.S. PATENT DOCUMENTS

| 4,010,903 | A | * | 3/1977  | Sakuri et al. ............... 239/533.1 |
| 4,964,795 | A |   | 10/1990 | Tooman |
| 4,981,431 | A |   | 1/1991  | Schmidt |
| 5,366,370 | A | * | 11/1994 | Gellert ......................... 425/549 |
| 5,591,465 | A |   | 1/1997  | Babin |

(Continued)

FOREIGN PATENT DOCUMENTS

| DE | 10008471 A1 | 8/2001 |
| JP | 55-31604 | 8/1953 |
| JP | S55140537 A | 11/1980 |
| JP | 2005-132026 A | 5/2005 |

OTHER PUBLICATIONS

International Search Report, 3 pages.

(Continued)

*Primary Examiner* — Tim Heitbrink
(74) *Attorney, Agent, or Firm* — Husky Injection Molding Systems Inc.

(57) ABSTRACT

Disclosed is a side gate nozzle assembly (108) having a nozzle body (210) and at least one side gate nozzle tip assembly (112) wherein the nozzle body (210) and the at least one side gate nozzle tip assembly (112) are slidably engaged to each other.

7 Claims, 10 Drawing Sheets

(56) References Cited

U.S. PATENT DOCUMENTS

| | | | |
|---|---|---|---|
| 5,952,016 A * | 9/1999 | Gellert | 425/190 |
| 6,988,883 B2 * | 1/2006 | Babin et al. | 425/549 |
| 7,179,081 B2 * | 2/2007 | Sicilia et al. | 425/549 |
| 7,396,226 B2 * | 7/2008 | Fairy | 425/549 |
| 7,614,869 B2 * | 11/2009 | Babin et al. | 425/549 |
| 7,658,606 B2 * | 2/2010 | Klobucar et al. | 425/564 |
| 8,282,387 B2 * | 10/2012 | Braun | 425/549 |
| 2002/0098262 A1 | 7/2002 | Babin | |
| 2004/0258796 A1 * | 12/2004 | Fairy | 425/570 |
| 2008/0044513 A1 | 2/2008 | Babin et al. | |
| 2008/0279978 A1 | 11/2008 | Babin et al. | |
| 2012/0181728 A1 * | 7/2012 | Greb | 264/328.15 |
| 2013/0202730 A1 * | 8/2013 | Esser et al. | 425/549 |
| 2013/0243899 A1 | 9/2013 | Babin et al. | |
| 2014/0037783 A1 * | 2/2014 | Gray et al. | 425/568 |

OTHER PUBLICATIONS

Thermoplay, German Plastics publication 100500451, 1981, 7 pages.

* cited by examiner

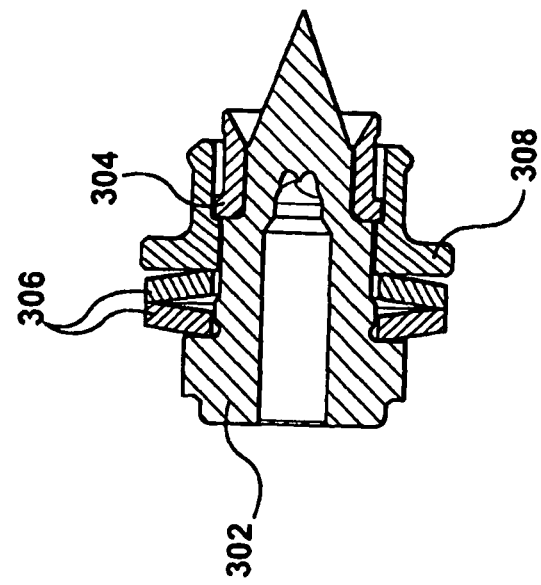
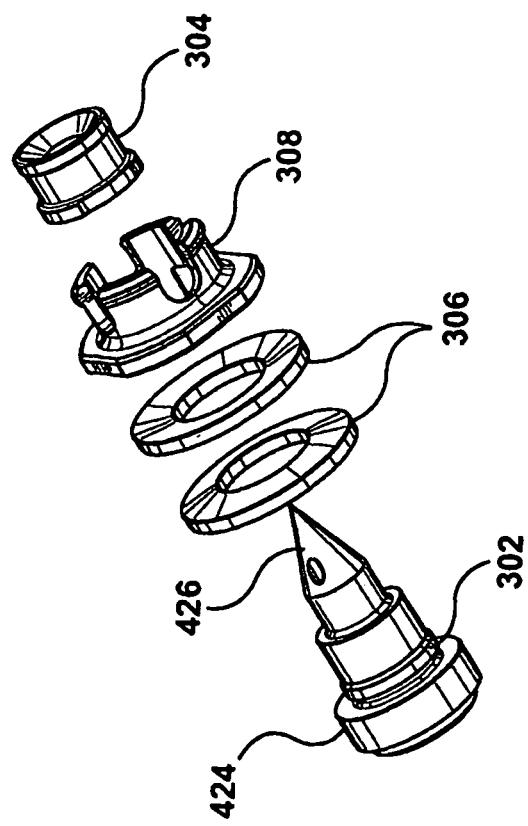

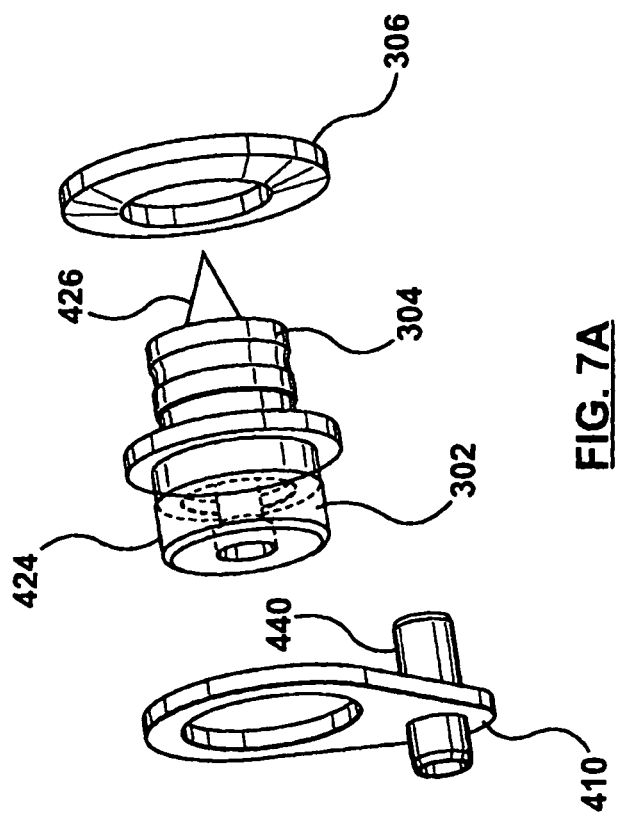
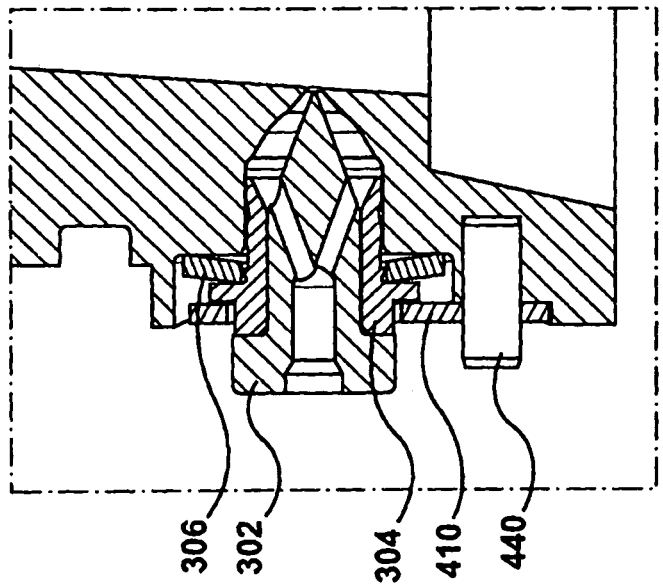
FIG. 7A
FIG. 7B

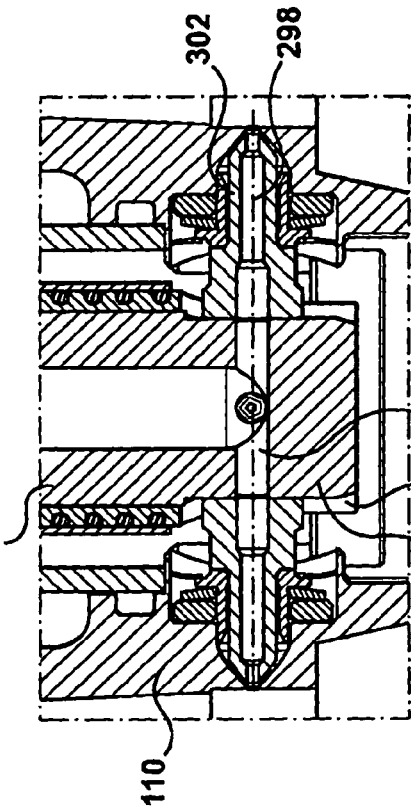
FIG. 10B
FIG. 10C
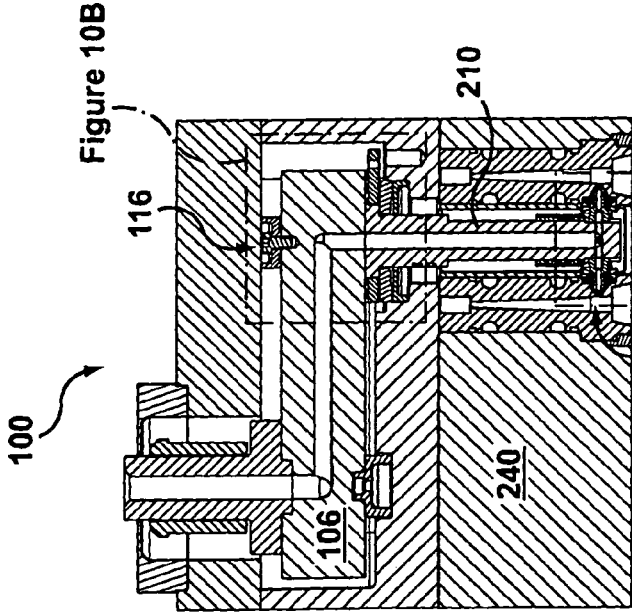
FIG. 10A

SIDE GATE NOZZLE ASSEMBLY

TECHNICAL FIELD

Aspects relate generally to a side gate nozzle assembly and more specifically to a side gate nozzle assembly having at least one side gate nozzle tip assembly slidably engaged with respect to a nozzle body.

BACKGROUND

Side gate nozzle assemblies are generally known in the prior art. In these prior art assemblies, the side gate nozzle tip assemblies are mostly fixed to the nozzle body of the side gate nozzle assemblies. During thermal heat up, the nozzle body expands in at least the longitudinal direction thereby relocating the side gate nozzle tip assemblies along the longitudinal axis. In addition, a manifold also expands forcing the nozzle body along the longitudinal direction. One disadvantage with the prior art systems is gate alignment during and after thermal heat up. A slight offset between the side gate nozzle tip assemblies and orifices of the cavity negatively impacts quality and potentially increases downtime.

SUMMARY

In one aspect, there is a side gate nozzle assembly having a nozzle body and at least one side gate nozzle tip assembly, wherein the nozzle body and the at least one side gate nozzle tip assembly are slidably engaged with respect to each other.

In another aspect, there is a side gate nozzle assembly having a nozzle body, and at least one side gate nozzle tip assembly retained to a cavity member but not fixed to the nozzle body.

In still another aspect, there is a side gate nozzle assembly having a nozzle body with a melt channel and at least one side gate nozzle tip assembly with a melt channel in fluid communication with the melt channel of the nozzle body, wherein the at least one side gate nozzle tip assembly is retained to a cavity member.

In still yet another aspect, there is a side gate nozzle assembly having a nozzle body and at least one side gate nozzle tip assembly, wherein the at least one side gate nozzle tip assembly has at least one compliant member for operably sealing the at least one side gate nozzle tip assembly to the nozzle body.

Other aspects and features will now become apparent to those skilled in the art upon review of the following detailed description with the accompanying drawings.

BRIEF DESCRIPTION OF THE DRAWINGS

The non-limiting embodiments will be more fully appreciated by reference to the following detailed description of the non-limiting embodiments when taken in conjunction with the accompanying drawings, in which:

FIGS. 6A, 6B are an isometric exploded view of an alternative embodiment of the side gate nozzle tip assembly (112) shown in FIGS. 3-5.

FIGS. 7A, 7B are an isometric exploded view of an alternative embodiment of the side gate nozzle tip assembly (112) shown in FIGS. 3-6.

FIG. 10A, 10B, 10C are cross sectional views of the hot runner system (100) including the side gate nozzle assembly (108) in a hot state.

The drawings are not necessarily to scale and may be illustrated by phantom lines, diagrammatic representations and fragmentary views. In certain instances, details not necessary for an understanding of the embodiments (and/or details that render other details difficult to perceive) may have been omitted.

DETAILED DESCRIPTION

Figure 1:
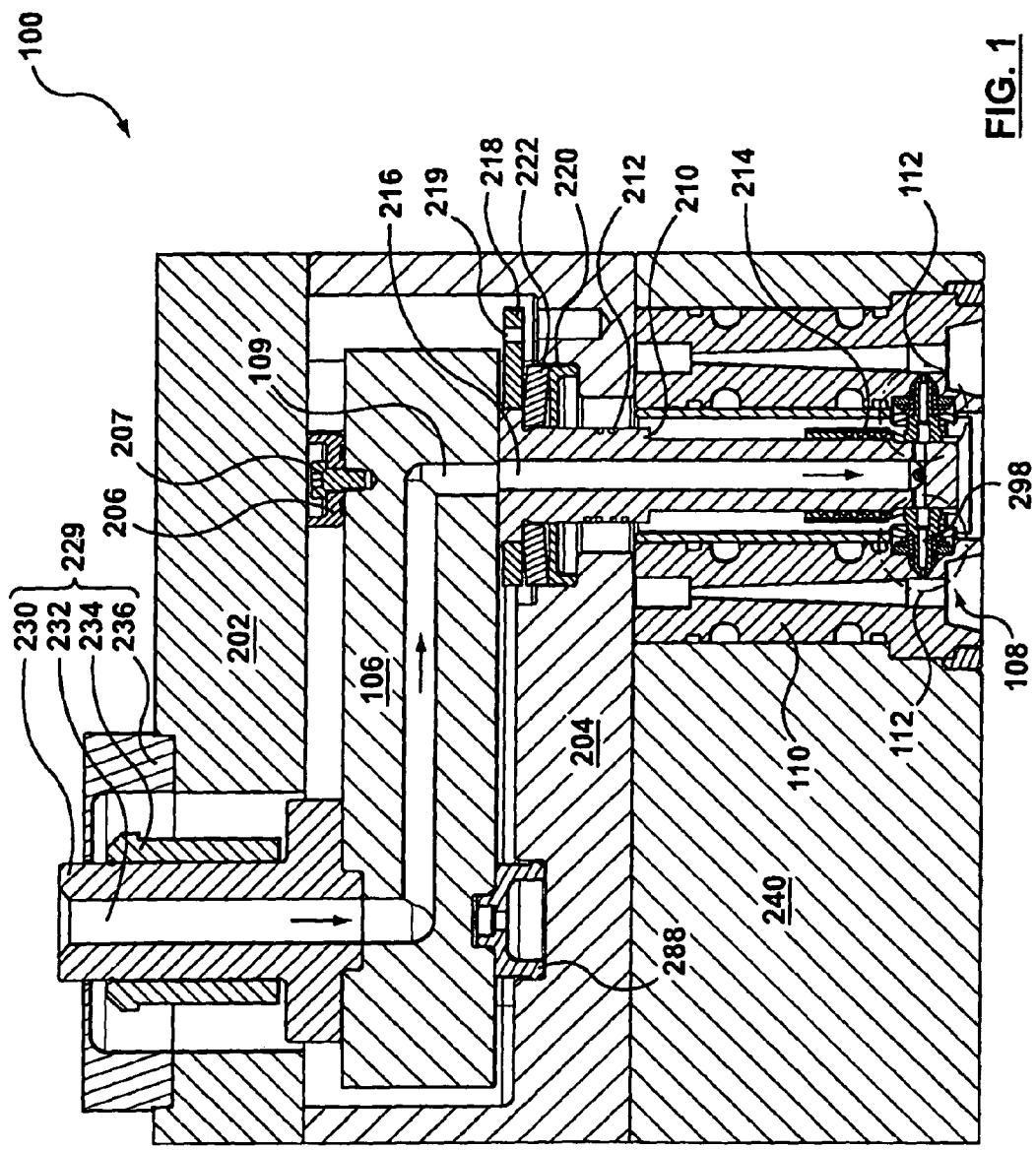
FIG. 1 is a cross sectional view of a hot runner system (100) having a side gate nozzle assembly (108) engaged to a mold plate (240).

FIG. 1 illustrates a side gate nozzle assembly (108) in a hot runner system (100). The hot runner system (100) is engaged to a mold plate (240), which is referred to hereinafter as being in the engagement state. In the engagement state, a melt channel (216) of a nozzle body (210) and a melt channel (298) of a side gate nozzle tip assembly (112) are in fluid communication with each other.

The side gate nozzle assembly (108) may include but is not limited to the nozzle body (210) and the side gate nozzle tip assembly (112). The side gate nozzle assembly (108) may also include but Is not limited to: (i) a nozzle heater (212) that is connected with the nozzle body (210), (ii) a nozzle tip heater (214) that is connected to a tip region of the nozzle body (210), (iii) the melt channel (216) of the nozzle body (210), and (iv) a nozzle aligner (218), which is ring shaped for convenience, and the nozzle aligner (218) defining a slot (219) for receiving a dowel (not shown) so that the nozzle body (210) may be oriented relative to the cavity member (110), and (v) a locating insulator (220), which is received in a pocket defined by the manifold plate (204). The locating insulator (220) receives the nozzle body (210) and maintains position of the nozzle body (210) relative to the manifold plate (204), and also acts to thermally insulate the nozzle body (210) from the manifold plate (204). The side gate nozzle assembly (108) may also include but is not limited to a spring member (222) that is placed between the locating insulator (220) and the nozzle aligner (218), or between the locating insulator (220) and the outer extending flanged portion of the nozzle body (210). The manifold (106) defines a melt channel (109) that is in fluid communication with the melt channel (216) of the nozzle body (210).

The side gate nozzle tip assembly (112) of the hot runner system (100) engages a cavity member (110). The nozzle body (210) is slidably engaged with the side gate nozzle tip assembly (112). When the side gate nozzle tip assembly (112) becomes disengaged from the nozzle body (210), the side gate nozzle tip assembly (112) remains retained to the cavity member (110), and the nozzle body (210) remains retained to a portion of the hot runner system (100), as is shown in FIG. 2.

Referring again to FIG. 1, the hot runner system (100) also includes but is not limited to: (i) a backing plate (202), (ii) a manifold plate (204), (iii) a manifold (106), which is received and supported between the manifold plate (204) and the backing plate (202), and (iv) a manifold locating insulator (288), which is located between the manifold plate (204) and the manifold (106). The manifold locating insulator (288) is used to thermally insulate, at least in part, the manifold (106) from the manifold plate (204). A back up insulator (206) is located between the manifold (106) and backing plate (202). A connector (207) is used to connect the back up insulator (206) with the manifold (106). The back up insulator (206) is used to thermally insulate the manifold (106) from the backing plate (202), and to position the nozzle body (210) longitudinally. The hot runner system (100) may further include but is not limited to: (i) a sprue (230) that defines a sprue melt passageway (232), (ii) a sprue heater (234) that is connected with the sprue (230), and (iii) a locating ring (236) mounted to the backing plate (202), and the locating ring (236).

Figure 2:
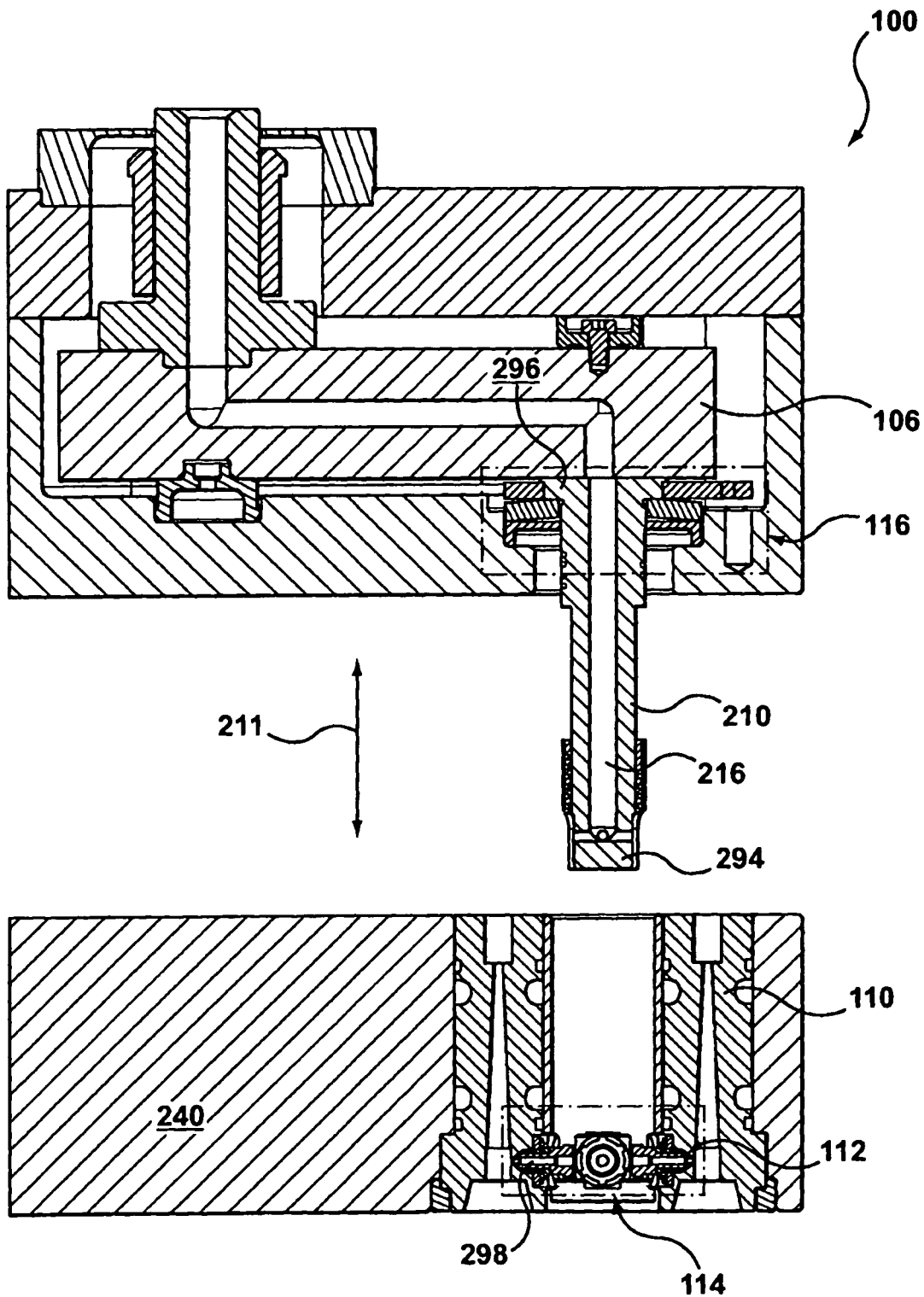
FIG. 2 is a cross sectional view of the hot runner system (100) having the side gate nozzle assembly (108) not fully engaged to the mold plate (240).

Turning now to FIG. 2 which illustrates the hot runner system (100) disengaged from the mold plate (240), which is referred to as being in the disengagement state. In the disengagement state, the melt channel (216) of the nozzle body (210) and the melt channel (298) of the side gate nozzle tip assembly (112) are not in fluid communication with each other because of the separation of the nozzle body (210) from the side gate nozzle tip assembly (112).

The hot runner system (100) and the mold plate (240) are movable relative to each other between the engagement state (FIG. 1) and the disengagement state (FIG. 2). Specifically, the hot runner system (100) and the mold plate (240) are movable towards and away from each other along a direction (211) between the engagement state and the disengagement state. In the engagement state as that shown in FIG. 1, the hot runner system (100) engages the mold plate (240) so that the side gate nozzle tip assembly (112) becomes engaged with the nozzle body (210) so that in operation the side gate nozzle tip assembly (112) is slidably engaged to the nozzle body (210). In the disengagement state as that shown in FIG. 2, the hot runner system (100) disengages or separates from the mold plate (240) so that the side gate nozzle tip assembly (112) becomes disengaged and separated from the nozzle body (210) while: (i) the side gate nozzle tip assembly (112) remains retained to the cavity member (110), and (ii) the nozzle body (210) remains retained to a portion of the hot runner system (100).

Referring again to FIG. 2, a manifold-nozzle interface (116) is depicted where a head (296) of the nozzle body (210) interfaces with the manifold (106). A nozzle-tip interface (114) is depicted where a distal end (294) of the nozzle body (210) interfaces with the side gate nozzle tip assembly (112) in the engagement state as that shown in FIG. 1. FIG. 1 shows the nozzle-tip interface (114) wherein the melt channel (216) of the nozzle body (210) is in fluid communication with the melt channel (298) of the side gate nozzle tip assembly (112).

The cavity member (110) may be a cavity plate, cavity insert, gate insert, mold insert, or other device inserted in a mold (herein collectively referred to as "cavity member (110)"). In an alternative embodiment, the cavity member (110) may be made up of one or more components. The side gate nozzle tip assembly (112) is in fluid communication with the cavity member (110).

The nozzle body (210) is in fluid communication with the manifold (106) and the side gate nozzle tip assembly (112). The nozzle body (210) and the side gate nozzle tip assembly (112) are slidably engaged with respect to each other while the side gate nozzle tip assembly (112) remains in fluid communication with the cavity member (110), and the nozzle body (210) remains in fluid communication with the manifold (106).

The nozzle body (210) and the side gate nozzle tip assembly (112) are separable from each other without the side gate nozzle tip assembly (112) losing tip location relative to the cavity member (110) as shown in FIG. 2. The side gate nozzle tip assembly (112) remains retained to the cavity member (110) while the nozzle body (210) remains retained to a portion of the hot runner system (100) in the disengagement state.

Figure 3:
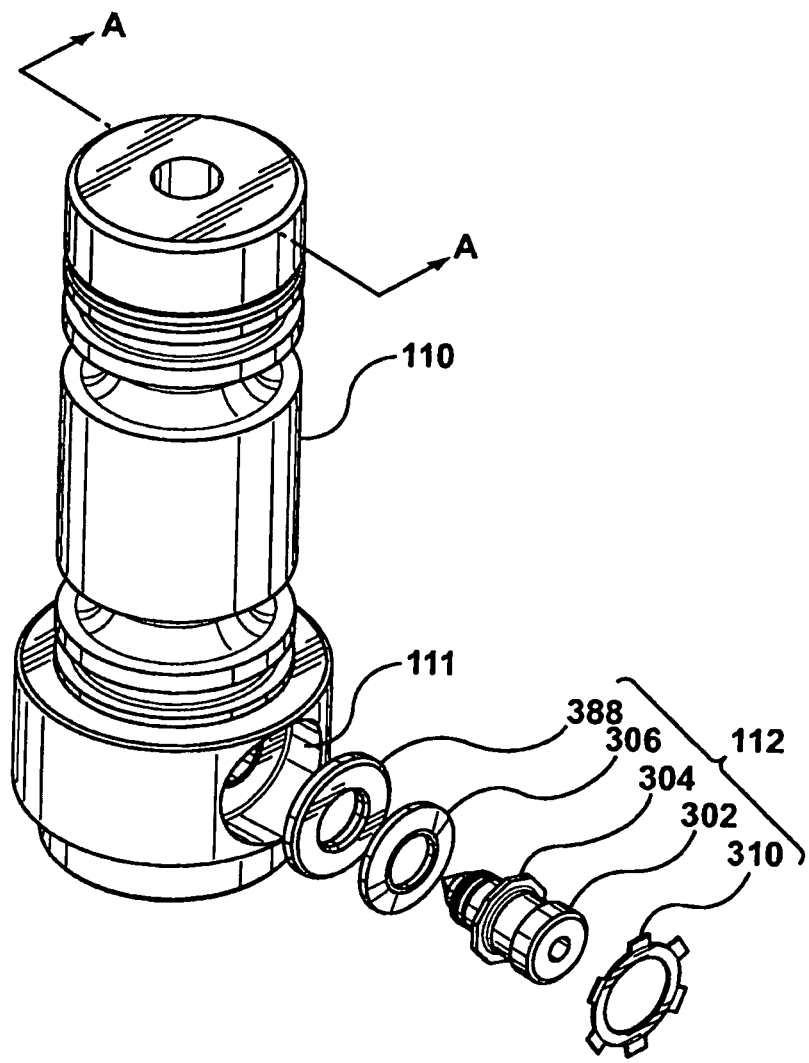
FIG. 3 is an isometric exploded view of a side gate nozzle tip assembly (112) along with a cavity member (110).

Referring now to FIG. 3, a compliant member (306), such as a Belleville spring, is used to force the side gate nozzle tip assembly (112) into slidable but sealing engagement with the nozzle body (210) during operation and while the sliding movement between the side gate nozzle tip assembly (112) and the nozzle body (210) occur during thermal expansion created by heat up to operational temperature. During heat up, there is thermal expansion of the nozzle body (210) in, among other directions, the longitudinal direction. During the heat up or thermal expansion stage, the compliant member (306) maintains the side gate nozzle tip assembly (112) in sealing engagement with the nozzle body (210) such that there is sufficient sealing pressure to preclude leakage while simultaneously allowing the nozzle body (210) to be in sliding and sealing engagement with the side gate nozzle tip assembly (112). The nozzle body (210) is not fixed or fixedly coupled to the side gate nozzle tip assembly (112).

In one embodiment, the side gate nozzle tip assembly (112) may include a nozzle tip receiver (111) configured to accommodate the side gate nozzle tip assembly (112). The side gate nozzle tip assembly (112) may also include but is not limited to: (i) a tip body (302), (ii) a seal (304), which may be ring shaped, (iii) the compliant member (306), (iv) an insulator (388), and (v) a retention member (310), such a retainer, clip, various other retention devices, etc.

The insulator (388) is received in the nozzle tip receiver (111) and is provided for creating a thermal barrier. The insulator (388) also locates and supports the side gate nozzle tip assembly (112). The compliant member (306) is then inserted against the insulator (388). The compliant member (306) biases the side gate nozzle tip assembly (112) against the nozzle body (210) at sufficient pressure to preclude leakage of the molten plastic from the melt channels (216, 298) while allowing sliding engagement between the nozzle body (210) and the side gate nozzle tip assembly (112). The seal (304) is attached to the tip body (302) for sealing and for locating the side gate nozzle tip assembly (112). The seal (304) may be press fit, snap fit, interference fit, welded, brazed, soldered, etc. to the tip body (302).

The tip body (302) along with the seal (304) is placed into the nozzle tip receiver (111) so as to abut the compliant member (306). The retention member (310) then abuts the seal (304) so as to retain the tip body (302) to the cavity member (110) thus the side gate nozzle tip assembly (112) is retained to the cavity member (110). It will be appreciated that various tip geometries may be used. Various insulator geometries are also possible. Each side gate nozzle tip assembly (112) is individually retained to its own mold cavity via the retention member (310), and this arrangement eases assembly, maintenance and manufacturing.

Figure 4B:
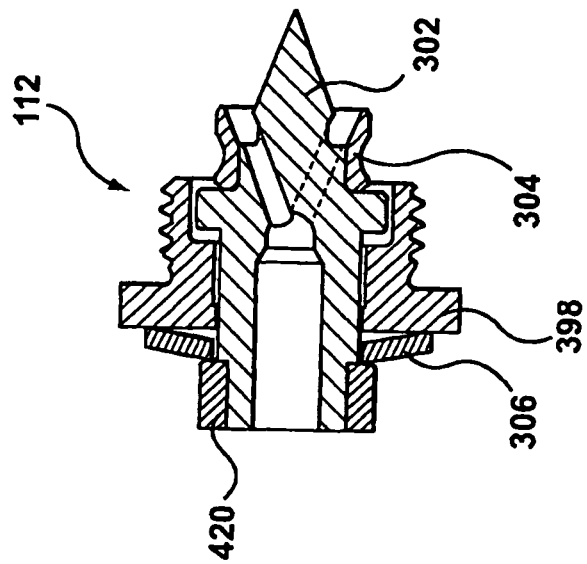
FIGS. 4A, 4B are an isometric exploded view and cross sectional view of an alternative embodiment of the side gate nozzle tip assembly (112) shown in FIG. 3.
Figure 4A:
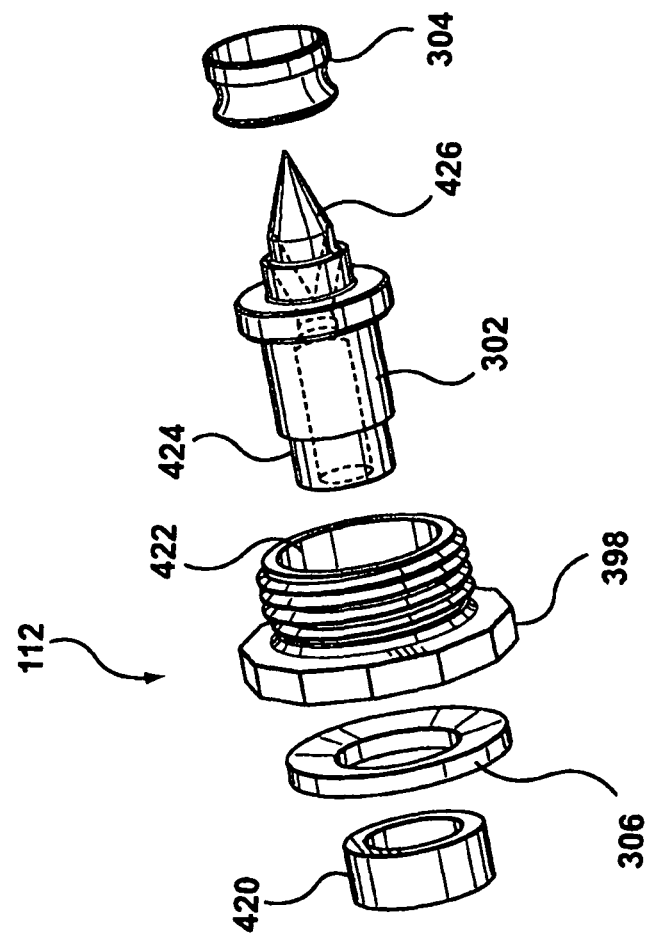

FIGS. 4A and 4B are an alternative embodiment of the side gate nozzle tip assembly (112) shown in FIG. 3. In this embodiment, the tip body (302) is assembled in a bore (422) of a threaded retainer (398). The complaint member (306) is slid over a first end (424) of the tip body (302) and then a sleeve (420) traps the compliant member (306) between the tip body (302) and the sleeve (420). The sleeve (420) may be press fit, snap fit, interference fit, welded, brazed, soldered, etc. to the first end (424) the tip body (302). The seal (304) may be press fit, snap fit, interference fit, welded, brazed, soldered, etc. to a second end (426) the tip body (302). After the seal (304), the threaded retainer (398), the compliant member (306), the sleeve (420) are assembled to the tip body (302), the side gate nozzle tip assembly (112) is threaded to the nozzle tip receiver (111) of the cavity member (110).

The compliant member (306) biases the side gate nozzle tip assembly (112) against the nozzle body (210) at sufficient pressure to preclude leakage of the molten plastic from the melt channels (216, 298) while allowing sliding engagement between the nozzle body (210) and the side gate nozzle tip assembly (112).

Figure 5B:
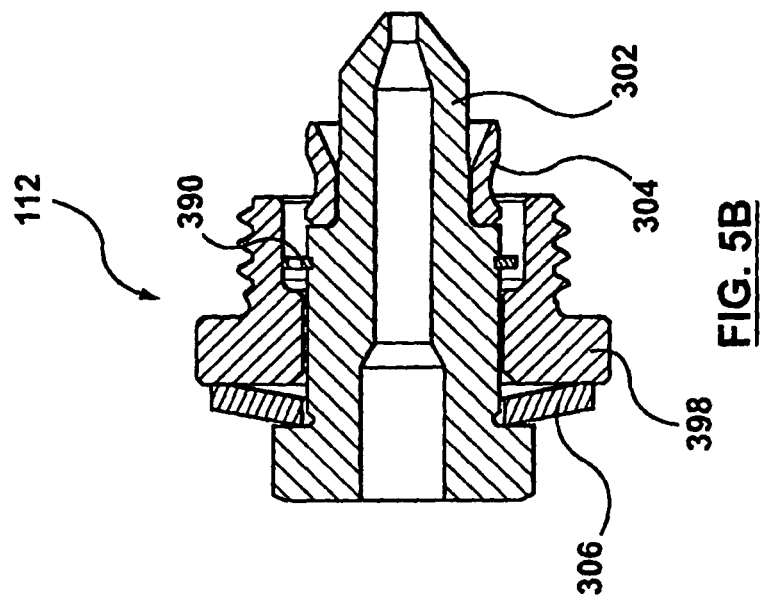
FIGS. 5A, 5B are an isometric exploded view and cross sectional view of an alternative embodiment of the side gate nozzle tip assembly (112) shown in FIGS. 3 and 4.
Figure 5A:
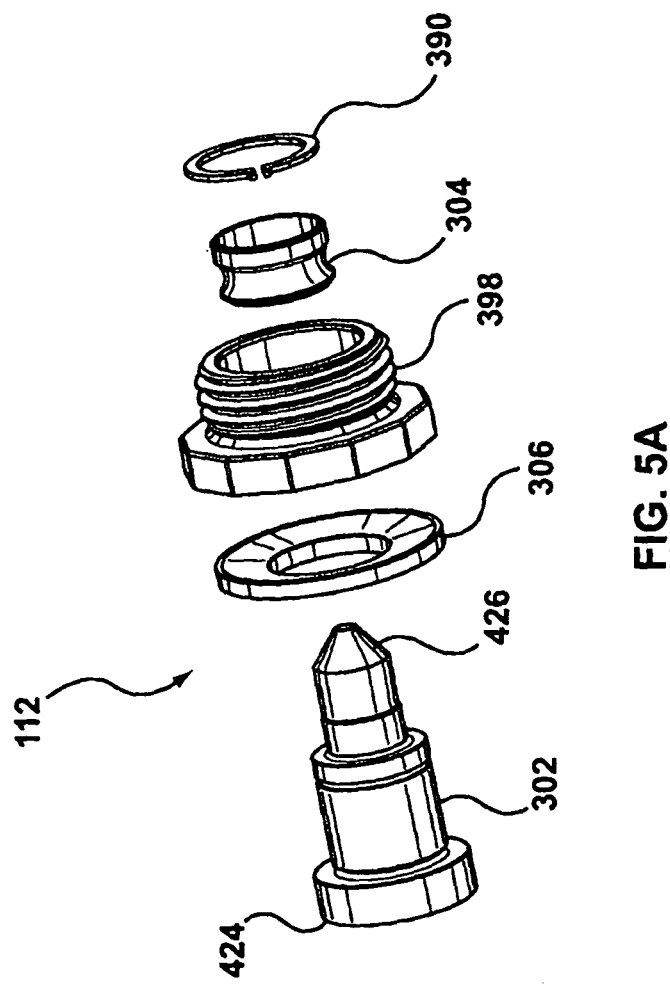

FIGS. 5A and 5B are an alternative embodiment of the side gate nozzle tip assembly (112) shown in FIGS. 3 and 4. In this embodiment, the tip body (302) is slipped through bores in the compliant member (306), threaded retainer (398), and the seal (304). A retaining ring (390) placed on the tip body (302) retaining the compliant member (306) and the threaded retainer (398) to the tip body (302). The seal (304) may be press fit, snap fit, interference fit, welded, brazed, soldered, etc. to a second end (426) the tip body (302). After the seal (304), the threaded retainer (398), the compliant member (306), and the retaining ring (390) are assembled to the tip body (302), the side gate nozzle tip assembly (112) is threaded to the nozzle tip receiver (111) of the cavity member (110).

The compliant member (306) biases the side gate nozzle tip assembly (112) against the nozzle body (210) at sufficient pressure to preclude leakage of the molten plastic from the melt channels (216, 298) while allowing sliding engagement between the nozzle body (210) and the side gate nozzle tip assembly (112).

FIGS. 6A and 6B are an alternative embodiment of the side gate nozzle tip assembly (112) shown in FIGS. 3-5. In this embodiment, the two compliant members (306) are slid over the second end (426) of the tip body (302) and then the retainer (308) is slid over the second end (426) of the tip body (302). The retainer (308) may be slip fit, press fit, snap fit, interference fit, etc. to the second end (426) of the tip body (302). Then the seal (304) may be press, fit, snap fit, interference fit, welded, brazed, soldered, etc. to the second end (426) the tip body (302). The seal (304) has a shoulder that prohibits the removal of the retainer (308) and compliant members (306) from the nozzle tip assembly. After the retainer (308), the compliant members (306), the seal (304) are assembled to the tip body (302), the side gate nozzle tip assembly (112) is press fit into the nozzle tip receiver (111) of the cavity member (110).

The compliant member (306) biases the side gate nozzle tip assembly (112) against the nozzle body (210) at sufficient pressure to preclude leakage of the molten plastic from the melt channels (216, 298) while allowing sliding engagement between the nozzle body (210) and the side gate nozzle tip assembly (112).

FIGS. 7A and 7B are an alternative embodiment of the side gate nozzle tip assembly (112) shown in FIGS. 3-6. In this embodiment, the seal (304) may be press fit, snap fit, interference fit, welded, brazed, soldered, etc. to the second end (426) of the tip body (302). The compliant member (306) is slid over the second end (426) of the tip body (302). A tab (410) is assembled to the first end (424) of the tip body (302). After the seal (304), the compliant member (306), and the tab (410) are assembled to the tip body (302), a spring pin (412) is placed through a bore in the tab (410) and a hole in the cavity member (110). The spring pin (412) has an interference fit with the bore in the tab (410) and the hole in the cavity member (110), thereby retaining the tip body (302) to the cavity member (110).

The compliant member (306) biases the side gate nozzle tip assembly (112) against the nozzle body (210) at sufficient pressure to preclude leakage of the molten plastic from the melt channels (216, 298) while allowing sliding engagement between the nozzle body (210) and the side gate nozzle tip assembly (112).

Figure 8:
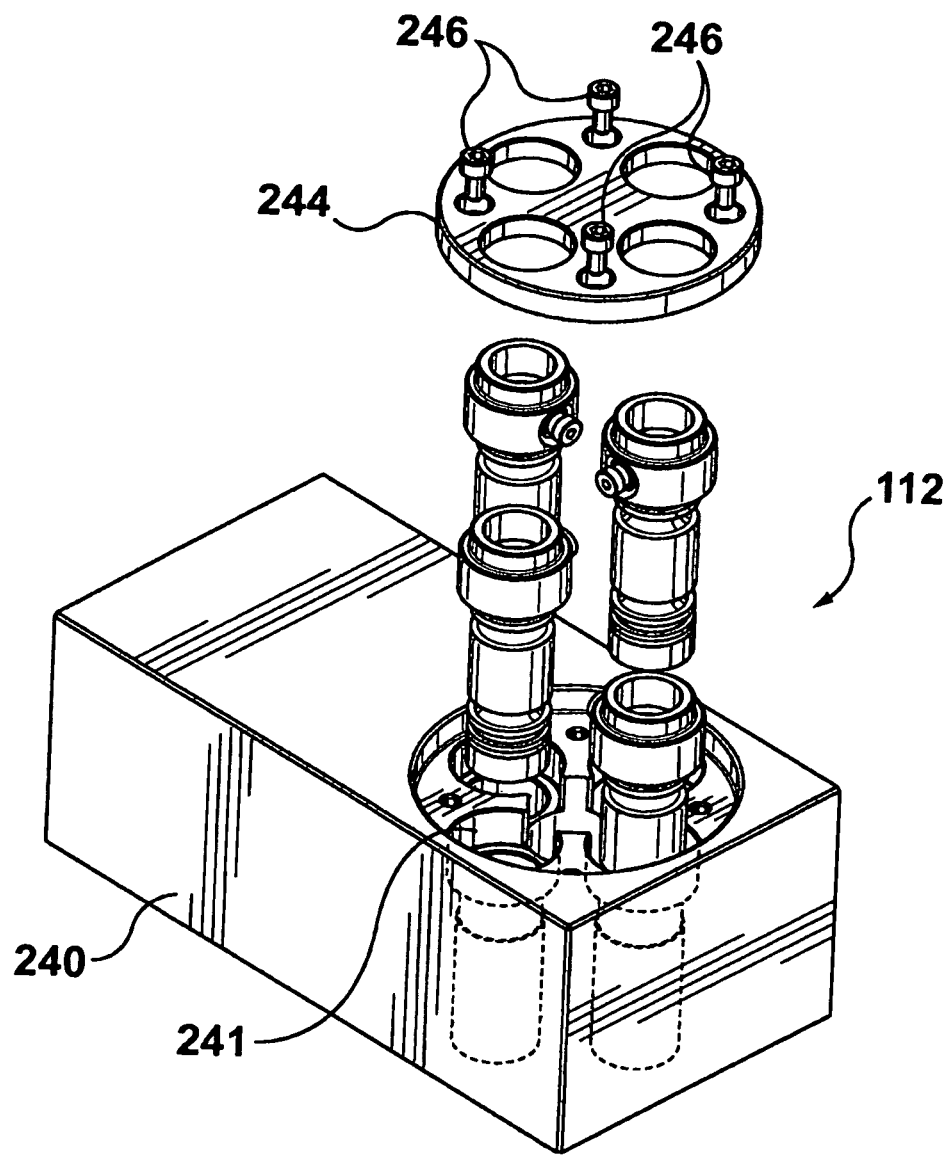
FIG. 8 is an isometric exploded view of a plurality of the side gate nozzle tip assemblies (112) in a mold insert receiver (241) of the mold plate (240).

FIG. 8 is a plurality of the side gate nozzle tip assemblies (112) in a mold insert receiver (241) of the mold plate (240) or multi-cavity embodiment of the hot runner system (100). A plurality of the side gate nozzle tip assemblies (112) are individually installed in the mold insert receiver (241) of the mold plate (240). A cover plate (244) is retained to the mold plate (240) with screws (246). The cover plate (244) precludes the introduction of contaminants to tip areas (not shown). This arrangement allows for easy handling in assembly and service in the press of individual gates.

Figure 9B:
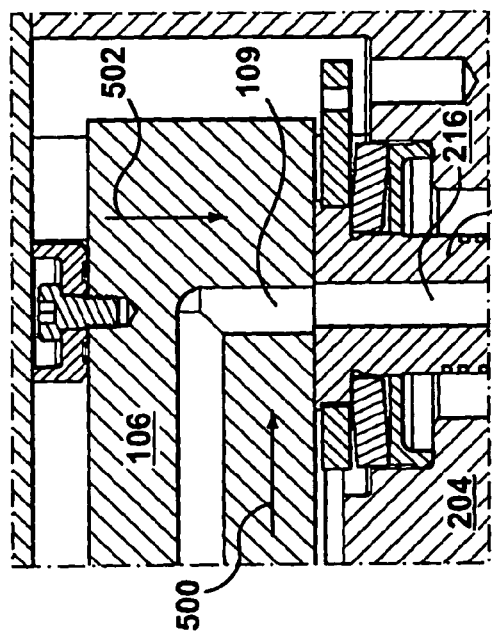
FIG. 9A, 9B, 9C are cross sectional views of the hot runner system (100) including the side gate nozzle assembly (108) in a cold state.
Figure 9C:
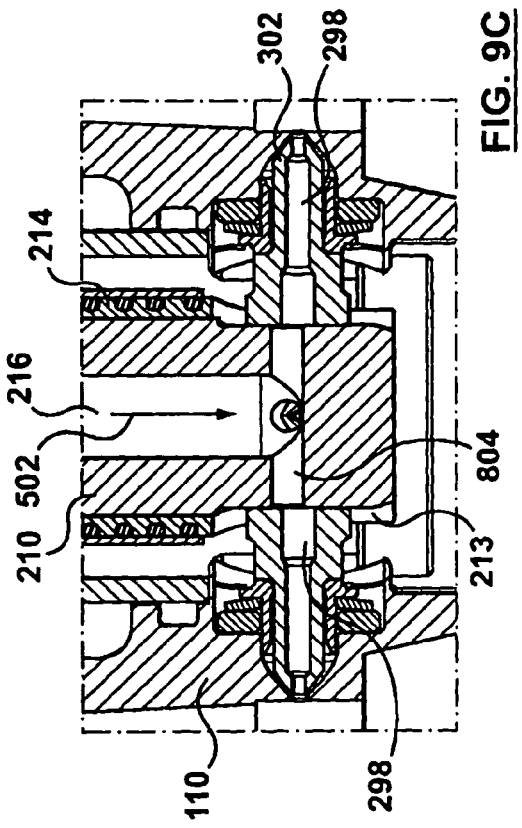
Figure 9A:
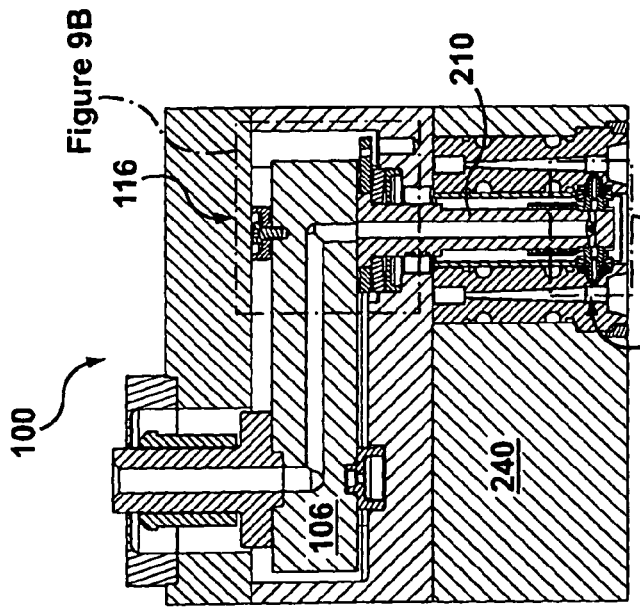

FIGS. 9A, 9B, 9C are cross sectional views of the hot runner system (100) in FIG. 1 in the non-operational or cold condition.

In FIG. 9A, the manifold nozzle interface (116) is depicted where the nozzle body (210) interfaces with the manifold (106), and the nozzle tip interlace (114) is depicted where the nozzle body (210) interfaces with the side gate nozzle tip assembly (112).

In FIG. 9B, the manifold nozzle interface (116) is depicted. Before the manifold (106) and the nozzle body (210) are heated to full operational temperature or as shown in their non-heated state, the melt channel (109) of the manifold (106) is offset or not aligned with the melt channel (216) of the nozzle body (210). During heat up as explained in FIGS. 10A, 10B, 10C, the offset is eliminated.

In FIG. 9C, the nozzle tip interface (114) is depicted. The tip body (302) has a melt channel (298), and the nozzle body (210) has a melt passageway (804). The melt passageway (804) of the nozzle body (210) and the melt channel (298) of the tip body (302) are offset in the non-heated state. During heat up as explained in FIGS. 10A, 10B, 10C, the offset is eliminated.

FIGS. 10A, 10B, 10C are cross sectional views of the hot runner system (100) of FIG. 1 in the operating condition or its heated state. Specifically, the manifold (106) and the nozzle body (210) have been heated to their operating temperature and the hot runner system (100) is at its operational temperature.

In FIG. 10A, the manifold-nozzle interface (116) is depicted where the nozzle body (210) interfaces with the manifold (106). The nozzle-tip interface (114) is depicted where the nozzle body (210) interfaces with the side gate nozzle tip assembly (112).

In FIG. 10B, the manifold-nozzle interface (116) is depicted. The hot runner system (100) is shown at its operating temperature. In the operating temperature, the melt channel (109) of the manifold (106) is aligned with the melt channel (216) of the nozzle body (210).

As the manifold (106) is heated to its operating temperature, the manifold (106) expands causing the melt channel (109) of the manifold (106) to shift for example to the right so that the melt channel (109) of the manifold (106) aligns with the melt channel (216) of the nozzle body (210) when the manifold (106) is fully heated to its operating temperature as shown in FIG. 10B.

In FIG. 10C, the nozzle-tip interface (114) is depicted. The hot runner system (100) is shown at its operating temperature.

At the operating temperature, the melt passageway (804) of the nozzle body (210) and the melt channel (298) of the tip body (302) are aligned in the heated state.

As the manifold (106) and the nozzle body (210) are heated to their operating temperatures, the manifold (106) and the nozzle body (210) expand causing the melt passageway (804) of the nozzle body (210) to move for example downward in FIG. 10C such that the melt passageway (804) of the nozzle body (210) and the melt channel (298) of the tip body (302) align with each other.

The nozzle body (210) defines external surfaces (213) perpendicular to the side gate nozzle tip assembly (112) axis's and parallel to the nozzle body (210) axis's. The external surfaces (213) permit relative movement between the nozzle body (210) and the side gate nozzle tip assemblies (112) when the manifold (106) and the nozzle body (210) are heated to operating temperature as that shown in FIG. 10C. The manifold (106) and nozzle body (210) will expand along the longitudinal direction (502), and as a result, the distal end 294 of the nozzle body (210) will be pushed toward the cavity. To accommodate the longitudinal movement of the nozzle body (210) between the cold state and operational or hot state of the hot runner system (100), the external surface (213) permits relative movement between the nozzle body (210) and the side gate nozzle tip assembly (112). The side gate nozzle tip assembly (112) and the nozzle body (210) of the side gate nozzle assembly (108) selectively engage one another or abut one another, but they are not fastened to each other.

In one embodiment, the external surfaces (213) are flat surfaces. The first end (424) of the tip body (302) slidably engages the flat surface.

The alignment of the second end (426) of the nozzle body (302) or tip of the side gate nozzle tip assembly (112), to the mold gate or cavity orifice influences part quality, gate vestige, cycle time, pressure drop and balance. The position of the side gate nozzle tip assembly (112) in the plane perpendicular to the lateral melt channel axis is governed by the seal (304). The position of the side gate nozzle tip assembly (112) along the lateral melt channel axis is governed by the nozzle body (210). The sliding contact between the side gate nozzle tip assembly (112) and the external surface (213) of the nozzle body (210) allows thermal expansion of the nozzle body (210) to be independent of the side gate nozzle tip assembly (112) position. The position of the nozzle body (210) in the plane perpendicular to the longitudinal axis of the nozzle body (210) is governed by the locating insulator (220) and the nozzle bore in the manifold plate (204). This position is constant (cold position and hot position) and therefore the position of the axis of the nozzle body. (210) is constant.

General Discussion

Some of the embodiments and aspects provided provide a side gate nozzle assembly (108) that is, at least in part, more robust, user-friendly for assembly and serviceability, reduced leakage capacity, larger temperature window capability for use in the hot runner system (100). The embodiment and aspects described herein may allow for the side gate nozzle assembly (108) to be aligned to the mold gate without the need for a telescoping nozzle head or a nozzle link (for example).

Other, possible advantages of the aspects and embodiments described herein are the ease of assembly, maintenance, and serviceability. The assembly sequence is much easier and faster than the other known systems. The assembly does not require extreme skill or multiple operators as when using cavity pods or split cavities. For example, a common occurrence among side gate molders is that they have to stop every so often in order to clean a blocked gate. Since this is down time, they would like to minimize this interruption. With the known systems using cavity pods, they are unable to remove just the cavities that are having the issues. They have to remove the entire set of cavities that are associated with the cavity pod in order to clean a blocked gate of a known hot-runner system. Then, they have to go through the complicated and cumbersome assembly procedure requiring a very skilled assembler. Users of split cavities are able to remove half of the cavity that is having issues but the tip will remain in place with the other cavity half still in the cavity plate. If the entire cavity needs to be disassembled from the mold then all cavity halves associated with the nozzle head along with the nozzle head itself would need to be removed. The embodiments and aspects described herein may allow, at least in part, for a faster and easier serviceability for cleaning a blocked gate compared to the known systems, as the embodiments and aspects allow for the ability to only remove the mold cavities that are having issues while leaving the other mold cavities undisturbed.

An embodiment or aspect provides coupling the side gate nozzle tip assembly (112) to the cavity member (110) providing gate alignment, and having the side gate nozzle tip assembly (112) in fluid communication with the nozzle body (210) but not attached or fixed to the nozzle body (210). The Interface between the side gate nozzle tip assembly (112) and the nozzle body (210) may be allowed to slide. The relative sliding motion (between the side gate nozzle tip assembly (112) and the nozzle body (210) accommodates the thermal growth of the hot runner system (100). In a cold state, the side gate nozzle tip assembly (112) may be retained to the cavity member (110), aligned with the cavity member (110), and in fluid communication with the nozzle body (210). The melt passageway (804) of the nozzle body (210) may not be in alignment with the melt channel (298) in the side gate nozzle tip assembly (112) (in the cold state or condition). As the hot runner system (100) is heated up, the side gate nozzle tip assembly (112) remain coupled or retained to the cavity member (110), aligned with the cavity member (110), and in fluid communication with the nozzle body (210). The nozzle body (210) will expand in length and slide against the face of the side gate nozzle tip assembly (112) (as the hot runner system (100) continues to be heated). As the nozzle body (210) thermally expands, the melt passageway (804) in the nozzle body (210) will become closer to alignment with the melt channel (298) in the side gate nozzle tip assembly (112). In the hot condition (that is, at operating temperature), the side gate nozzle tip assembly (112) remains coupled to the cavity member (110), aligned with the cavity member (110), and in fluid communication with the nozzle body (210). The melt passageway (804) within the nozzle body (210) is in alignment with the melt channel (298) of the side gate nozzle tip assembly (112), as illustrated in FIGS. 10A, 10B, 10C. The spring member (222), such as Bellville washer, or other load generating compliant feature, may be used to ensure that the side gate nozzle tip assembly (112) remains in fluid communication with the nozzle body (210) and provide the required sealing force at this interface.

The side gate nozzle tip assembly (112) would first be coupled to the mold cavities. The mold cavities would then be assembled within a cavity plate with a cover plate for safety and protection, etc. The cover plate (244) precludes the introduction of contaminants to the tip area. The hot runner system (100) would be assembled and include among others the sprue (230), the manifold (106), and the nozzle body (210), the spring member (222), the locating insulator (220), and the back up insulator (206) placed in a manifold plate and covered with a backing plate. The cavity plate and the hot runner system (100) would then be assembled together, as depicted in the FIGS.

The sequence for cleaning a blocked mold gate or for any serviceability is as follows: first, the cavity plate should be unfastened from the hot runner assembly and should be latched to the core side of the mold. The platens of the molding system are then opened in order to break the plastic slugs between the side gate nozzle tips and the nozzle bodies. The cavity plate may then be unlatched from the core side of the mold and reattached to the hot runner system (100). The platens are then opened along that the parting line of the mold. From here, the cover plates over the drops having any negative issues may be removed. Once the cover plates are removed, then there is complete access to the mold cavities themselves. Individual mold cavities are now able to be removed from the cavity plate. Only the mold cavities with issues need to be pulled from the system. Once the mold cavity is removed, the side gate nozzle tip retained to the mold cavity may be disassembled allowing access to the mold gate for cleaning, etc. After the blockage has been removed, the side gate nozzle tip may be reassembled to the mold cavity, and the mold cavity placed backed into the cavity plate and protected with the cover plate.

It is noted that the foregoing has outlined some of the more pertinent non-limiting aspects or embodiments. Thus, although the description is made for particular arrangements and methods, the intent and concept of the aspects and embodiments is suitable and applicable to other arrangements and applications. It will be clear to those skilled in the art that modifications to the disclosed aspects or embodiments can be effected without departing from the scope the independent claims. It is understood that the described aspects or embodiments are merely illustrative of the independent claims.

What is claimed is:

1. A side-gated injection molding apparatus comprising:
   an injection manifold assembly for distributing a melt stream of moldable material to a plurality of mold cavities of a mold that are aligned on opposing sides of the injection manifold assembly,
   the injection manifold assembly having a plurality of melt passageways with each melt passageway being in fluid communication with a respective mold cavity of the plurality of mold cavities, and
   a plurality of side gate nozzle tip assemblies for receiving the melt stream from the plurality of melt outlets of the injection manifold assembly and delivering the melt stream to the plurality of mold cavities,
   wherein each nozzle tip assembly includes a nozzle tip coaxially received within a gate seal structure and wherein the gate seal structure includes an inner sealing component coupled within an outer sealing component such that relative positioning between said components applies a sealing preload between the nozzle tip assembly and a first surface proximate to a respective melt outlet of said nozzle tip assembly and a second surface surrounding a respective mold gate of a corresponding mold cavity.

2. The side-gated injection molding apparatus of claim 1, wherein the injection manifold assembly further includes an injection manifold portion having opposing side surfaces in which the plurality of melt passageways are formed.

3. The side-gated injection molding apparatus of claim 2, wherein the first surface proximate to a respective melt passageway is a respective side surface of the injection manifold portion that surrounds the melt passageway against which an upstream surface of at least one of the nozzle tip and the inner seal component of the associated nozzle tip assembly are slidably disposed so as to accommodate thermal expansion.

4. The side-gated injection molding apparatus of claim 3, wherein the injection manifold is T-shaped.

5. The side-gated injection molding apparatus of claim 1, wherein the outer sealing component includes a face seal surface for contacting and sealing against the second surface surrounding the respective mold gate of the corresponding mold cavity.

6. The side-gated injection molding apparatus of claim 2, wherein a downstream end of the inner sealing component includes an outer circumferential surface for contacting and sealing against a bore that is coaxial with and leads to the respective mold gate of the corresponding mold cavity.

7. The side-gated injection molding apparatus of claim 1, wherein a downstream end of each nozzle tip assembly is received within a bore that surrounds a mold gate of the respective mold cavity associated therewith.

\* \* \* \* \*